United States Patent [19]

Murphy

[11] Patent Number: 4,762,902

[45] Date of Patent: Aug. 9, 1988

[54] ELECTRON CURABLE POLYURETHANES

[75] Inventor: Walter T. Murphy, Cuyahoga Falls, Ohio

[73] Assignee: The B. F. Goodrich Company, Akron, Ohio

[21] Appl. No.: 809,591

[22] Filed: Dec. 16, 1985

[51] Int. Cl.$^4$ ........................ C08G 18/10; C08G 18/67
[52] U.S. Cl. ..................................... 528/75; 528/440; 528/438; 528/415; 528/454
[58] Field of Search ................. 528/75, 440, 438, 415, 528/454

[56] References Cited

U.S. PATENT DOCUMENTS 4,408,020 10/1983 Kolycheck .......................... 528/75

Primary Examiner—John Kight
Assistant Examiner—M. L. Moore
Attorney, Agent, or Firm—J. Hughes Powell, Jr.

[57] ABSTRACT

Electron beam curable polyurethanes that have significantly improved dispersibility, improved magnetic pigment binder utility and result in improved magnetic tape for use in a variety of applications. This is accomplished by providing an oligomeric polyurethane that contains pendant carboxyl groups along the backbone chain.

16 Claims, No Drawings

ELECTRON CURABLE POLYURETHANES

BACKGROUND OF THE INVENTION

Electron curing has been applied to preparation of supported cured magnetic coatings of certain polyurethane compositions and a magnetic pigment, for example, in the form of discs or tapes. These products are useful in video, audio and data processing equipment. Oligomeric polyurethanes terminated with unsaturated acrylate groups that form reactive radicals for curing and cross-linking under the influence of electron beam radiation are being increasingly used to replace the chemically cross-linked polyurethanes previously used.

Typical U.S. patents describing these acrylate terminated polyurethanes include: No. 4,260,703 that discloses radiation curable urethane-acrylates preparing by reacting an alkoxylate of an ester diol such as 2,2-diemthyl-3-hydroxypropyl-2,2-di-methyl-3-hydroxypropionate with a diisocyanate, capped with a hydroxyalkyl acrylate such as hydroxyethyl acrylate; No. 4,264,752 that discloses compositions formed by the reaction of a polycarbonate polyol, a polyisocyanate and a hydroxy acrylate monomer as hydroxyethyl acrylate that can be used as radiation curable coatings; No. 4,408,020 that discloses the reaction products of a hydroxyl terminated polymer, unsaturated polyethers containing at least one terminal double bond group and a diisocyanate; and No. 4,446,286 that discloses reaction products of a hydroxyl terminated polymer, a terminally unsaturated polyether and an organic diisocyanate, which is then mixed with an acrylate terminated polyurethane. These materials as a class are generally referred to as oligomeric polyurethanes. While they are cured by an electron beam to form useful magnetic tapes for example, they have disadvantages.

For example, a major problem is poor dispersibility of the magnetic pigment at high loadings, as about 75 to 80 weight percent, which is an essential requirement for the polyurethane binder in many applications such as the home video tapes. Polyurethanes that allow good dispersibility at high loadings and that are readily cured by electron radiation are among the objects of this invention.

SUMMARY OF THE INVENTION

Electron beam curable polyurethanes that have significantly improved dispersibility, improved magnetic pigment binder utility and result in improved magnetic tape for use in a variety of applications and this is accomplished or obtained by providing an oligomeric polyurethane that contains terminal acrylic groups and pendant carboxyl groups along the backbone chain.

DETAILED DESCRIPTION

In one embodiment of the invention, the pendant carboxyl groups are introduced along the polyurethane chain by reacting, along with the hydroxyl terminated polymer, a difunctional monomer that also contains at least one carboxyl group, an organic polyisocyanate, and a hydroxyacrylate.

The hydroxyl terminated polymers include a variety of materials as is well known to those skilled in the art. These include, for example, hydroxyl terminated polyesters, polyethers, polylactones, polycarbonates, polyhydroxycarbons, polyepihalohydrins and the like. Normally used are hydroxyl-terminated compounds having molecular weights greater than about 300 to 400 to 10,000. The most commonly used compounds, macropolyols, are hydroxyl-terminated polyesters, polyethers, polacetals, polycarbonates, polyepihalohydrins, polybutadienes and polyacrylates, alone or in mixtures, having molecular weights greater than about 400, optionally with polyfunctional chain extenders such as diols. Useful materials may be obtained from mixtures of a macroglycol and small polyfunctional polyol chain extenders such as a alkylene glycol or ether glycol, a cycloaliphatic glycol, or an aromatic-aliphatic glycol, and the like.

The polyester glycols include linear hydroxyl-terminated polyesters having molecular weights between about 400 and 10,000, usually about 2,000. The polyesters utilized include those prepared for example by the polyesterification of aliphatic dicarboxylic acids including, for example, malonic, adipic, succinic, pimelic, suberic, azelaic, sebacic and the like or their anhydrides with polyols. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 1 to 10 carbon atoms, preferably 4 to 6 carbon atoms. The phthalic acids are also useful. The polyols, usually glycols, used in the preparation of the polyesters by reaction with the dicarboxylic acids are normally aliphatic polyols containing between 2 and 10 carbon atoms, usually 2 to 6, such as ethylene glycol, propanediol, butanediol, hexamethylene glycol, dicamethylene glycol, 2-ethylhexanediol-1,6, neopentyl glycol and the like; 1,4-cyclohexanedimethanol; and aromatic polyols or bis-1,4($\beta$-hydroxyethoxy)benzene. Poly-esteramides also are contemplated, usually obtained by substitution of a diamine or amino alcohol for at least part of the glycol.

Poly(epsilon-caprolactone)diols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms, for example, ethylene glycol, 1,2-propane diol, butanediol-1,4, hexamethylene glycol and the like. Ethylene glycol provides excellent polyesters.

The lactones preferred for preparing the polyesters are epsilon-caprolactones having the general formula

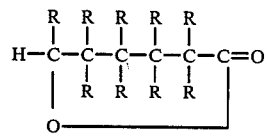

wherein at least 6 of the R's are hydrogen and the remainder are hydrogen or alkyl groups containing 1 to 10 carbon atoms, preferably methyl. Mixtures of lactones may be employed to form the polyesters as epsiloncaprolactone and trimethyl-epsilon-captolactone, α-methyl-epsilon-caprolactone, β-methyl-epsiloncaprolactone, dimethyl-episolon-caprolactone, and the like. The lactones are polymerized readily by heating with the bifunctional reactant to a temperature of about 100° to about 200° C. Catalysts may be employed if desired. Particularly preferred are poly(epsilon-caprolactone)diols having molecular weights in the range of about 400 to about 10,000, normally to about 2,000.

The hydroxyl(polyalkylene oxide), or polyether macroglycols, preferably are essentially linear hydroxyl-terminated compounds having ether linkages as the major linkage joining carbon atoms. The molecular weights may vary between 400 and 10,000, usually to about 2,000. The hydroxyl(polyalkylene oxide)s as hydroxyl poly(tetramethylene oxide), hydroxyl poly(trimethylene oxide), hydroxyl poly(hexamethylene oxide), hydroxyl poly(ethylene oxide) and the like of the formula HO[(CH$_2$)$_n$O]$_x$H wherein n is a number from 2 to 6 and x is an integer, and alkyl substituted types such as hydroxyl poly(1,2-propylene oxide); tetrahydrofuran and ethylene oxide copolyethers; and the like.

The polycarbonate glycols include reaction products of polyols and phosgene or organic carbonate compounds. Of the polyols, poly(oxyalkylene glycol)s may have the general formula HO(R'O)$_x$H wherein R is an alkylene radical containing 2 to 10 carbon atoms and x is an integer, typically from 1 to 5. The alkylene glycols normally contain 2 to 10 carbon atoms. Typical materials include, for example, ethylene glycol, 1,4-butanediol, 1,6-hexanediol, diethylene glycol, 1,2-propylene glycol, dipropylene glycol, 2-ethyl-1,6-hexanediol, 1,5-pentanediol, 1,4-cyclohexanediol, 1,2,6-hexanetriol, polyoxyethylene glycols and triols, polyoxypropylene glycols, and the like. The organic carbonates may have the formula $$R''OCOR''$$

wherein the R's are alkyl radicals containing 1 to 8 carbon atoms, and cyclic radicals containing 6 to 10 carbons in the ring. Typical compounds include dimethyl carbonate, diethyl carbonate, dipropyl carbonate, diphenyl carbonate, dicyclohexyl carbonate, and the like. Polyurethanes of this invention made with poly(hexamethylene carbonate) glycol are readily cured and have good properties.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and the like reacted with glycols; for example, ethylene glycol, hexanediol, diethylene glycol, and the like which are well known to those skilled in the art. Generally, the polyacetals may be considered to be reaction products of aldehydes and glycols. The molecular weights of the polyacetal will be varied from about 400 to 10,000, normally about 2,000.

Typically polyhydrocarbonurethanes useful in the practice of the invention will include hydroxyl-terminated liquid polymers having an aliphatic polymeric backbone prepared by polymerizing at least one vinylidene monomer having at least one terminal CH$_2$<-group per monomer molecule together with at least one hydroxyl containing disulfide as is described in U.S. Pat. No. 4,120,766. Such liquid polymers may have a backbone derived from, for example, ethylene, isobutylene, butadiene, acrylate and methacrylate esters alone or with other vinylidene monomers containing at least one terminal <CH$_2$ group such as styrene or acrylonitrile as is described in the aforementioned patents. Other methods for making hydroxyl containing liquid polymers are well known such as reacting an aminoalcohol with a liquid carboxyl terminated polymer having backbones of the type disclosed above. The molecular weight of these materials will range from about 400 to 5,000.

A great variety of other hydroxyl-terminated polymers may be used. These include the hydroxyl-terminated polyesters, polylactones, polyethers, polyepihalohydrins, polyhydroxycarbons, polycarbonates and the like described herein above. Typical other hydroxyl-terminated materials include those described in the following U.S. patents, the disclosures of which are incorporated herein and made a part hereof. No. 3,551,472 discloses hydroxyl-terminated polymers, such as copolymers of vinylidene monomers having at least one terminal <CH$_2$ group such as butadiene-1,3 and acrylonitrile and polymers of alkyl acrylates, with a diol. No. 3,712,916 discloses hydroyl-terminated polymers prepared by reaction of carboxyl-terminated polymers with an alkylene oxide such as ethylene oxide in the presence of an amine catalyst. No. 3,850,856 discloses preparation of liquid hydroxyl-terminated epihalohydrins such as epichlorohydrin, prepared by cationic polymerization in the presence of water or ethylene glycol in the presence of a trialkyl oxonium salt of an HMF$_6$ catalyst. No. 4,120,766 teaches preparation of liquid hydroxyl containing polymers by polymerization of at least one vinylidene monomer with at least one hydroxyl containing disulfide (and trisulfide as in No. 4,238,397) in the presence of ultraviolet radiation. The molecular weight may be varied.

If small glycols are used as chain extenders with the macropolyols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol, 1,4-butenediol, 2-butene-1,4-diol, and the like. Cycloaliphatic glycols such as cyclohexanedimethanol, and aromatic-aliphatic glycols such as bis-1,4-(β-hydroxyethoxy)benzene, may also be employed.

The amount of glycol chain extender used with the macropolyol and the diisocyanate may vary from about 0.1 to 10 mols per mol of macroglycol. Excellent polyurethanes are obtained with a molar ratio of one mol of macropolyol and 1 to 5 mols of the small chain extender glycol. Substituted glycols also may be used.

The polyfunctional carboxyl containing monomer or reactant preferably has at least two active hydrogen functional terminal groups that are reactive with an isocyanate group, as an amine or hydroxyl, and at least one pendant carboxyl group. A generic formula may be represented by

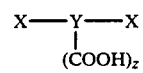

wherein X is amine, NH$_2$; or more preferably, hydroxyl, OH; Y is the backbone containing 3 to 12 carbon atoms free of other pendant groups reactive with an isocyanate group other than carboxyl, and z is an integer of at least 1 to 4, preferably 3. There may be 2 or more carboxyl groups pendant to the backbone. Typical compounds include 2,2-dimethylol propionic acid[bis-(2,2-hydroxymethyl)propionic acid]; 2,2-dimethylol butyric acid; 3,5-dimethylolbenzoic acid; ethylhydrogentartrate; bis(2,2'-dimethylol)hexanedioc acid; 2,2-aminomethyl propionic acid; 3,5-diaminobenzoic acid; α,γ-diaminovaleric acid; and the like.

The organic polyisocyanates will include, for example, alicyclic, aliphatic and aromatic diisocyanates. Such aliphatic diisocyanates include for example, hexamethylene diisocyanate, methylenebis(4-cyclohexyl isocyanate), isophorone diisocyanate, etc. The aromatic diisocyanates include naphthalene-1,5-diisocyanate, diphenyl methane-4,4'-diisocyanate, toluene diisocyanate, p-phenylene diisocyanate, dibenzyl diisocyanate, diphenyl ether diisocyanates, bitolylene diisocyanates, m- and p-tetramethylxylene diisocyanate, and the like, for example diisocyanates of the formula

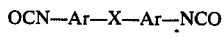

OCN—Ar—X—Ar—NCO wherein Ar is cyclic, i.e., an arylene or alicyclic radical, and X may be a valence bond, an alkylene radical containing 1 to 5 carbon atoms, oxygen, sulfur, sulfoxide, sulfone and the like.

Preferably the diisocyanates are aromatic, aliphatic, or alycyclic with symmetrical structure such as those of the formulas

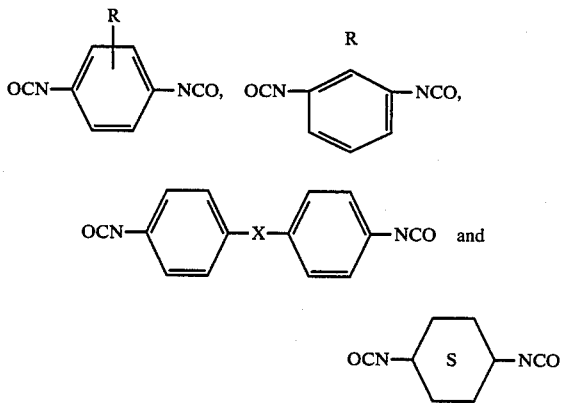

wherein R is hydrogen or alkyl and X is a valence bond, an alkylene radical of 1 to 5 carbon atoms, oxygen, sulfur, sulfoxide, and the like, and S denotes saturation.

The hydroxylacrylate or alkacrylate includes acrylic acid and alkacrylic acid derivatives, including methacrylic acid and ethacrylic acid. Typical compounds include hydroxymethyl acrylate, 2-hydroxyethyl acrylate, 2-hydroxybutyl acrylate, 2-hydroxyethyl methacrylate, 2-hydroxypropyl acrylate, 2-hydroxypropyl methacrylate, 2-hydroxyethyl ethacrylate, diethylene glycol monoacrylate, diethylene glycol monomethacrylate and the like. Useful materials may be represented by the formula

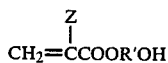

$$CH_2=\overset{Z}{\underset{|}{C}}COOR'OH$$

wherein Z is hydrogen, methyl, ethyl or propyl, and R' is a divalent alkylene radical containing 2 to 8 carbon atoms, preferably 2 to 3 carbon atoms. An excess of these hydroxylalkyl acrylyl compounds is reacted with the isocyanate terminated prepolymers to insure that essentially all of the polyurethane molecules are acrylate terminated. It is understood that the term "acrylate" includes both acrylates and alkacrylates.

In preparing the oligomeric polyurethanes, in one embodiment, the hydroxyl-terminated polymer and carboxyl containg polyfunctional material are first reacted with an excess of the organic polyisocyanate to prepare an isocyanate-terminated prepolymer that is then reacted with at least equivalent amount of hydroxylacrylate. The The oligomeric polyurethanes may also be prepared by reacting the hydroxylacrylate with the organic polyisocyanate to form an intermediate, normally using a molar equivalent of each reactant, and reacting this product with the hydroxyl-terminated polymer and carboxyl-containing monomer.

Catalysts may be used to speed up the polyurethane formation and any of those catalysts normally used by those skilled in the art may be employed. Typical catalysts include dibutyltin dilaurate, stannous octoate, phenyl mercuric propionate, lead octoate, iron acetylacetonate, magnesium acetylacetonate, triethylene diamine, and the like. These may be used, normally in amounts from about greater than 0.01 up to 10 parts per 100 parts of polyurethane being formed, and more normally greater than 0.03 to 5 phr.

The molar ratio of reactants used may be varied. For example, based on one mol total of the hydroxyl macropolymer and difunctional carboxyl containing material, there may be used greater than about one mol of the hydroxy acrylate, and an amount of organic diisocyanate sufficient to react with substantially all of the functional groups reactive with an isocyanate, so that substantially all of the isocyanate groups are reacted so that less than about 5 weight percent of unreacted isocyanate groups remain. Preferably there is used about 2 to about 4 mols of organic diisocyanate, about 2 to about 6 mols of hydroxy acrylate and one mol total of hydroxyl-terminated polymer and hydroxyl-terminated carboxyl containing compound in a ratio from about 0.95:0.05 to 0.2:0.8 of polymer to carboxyl-containing material.

A molar excess of the diisocyanate over the total mols of macroglycol and carboxyl-containing glycol or diamine, or hydroxyacrylate if reacted first, is used. The molar excess used in the prepolymers is usually about 2:1 but may be as low as 1.4:1 up to about 4:1; and 1:1 to 2:1 in the reaction if the reaction is the hydroxylacrylate with the diisocyanate. The hydroxy(meth)acrylate used in the preparation of the prepolymer is equivalent to or greater than equivalent to the isocyanate remaining after all of the macroglycol and carboxyl-containing glycol or diamine has been reacted with the diisocyanate. Within these ranges, essentially all of the isocyanate groups theoretically are reacted. It is sufficient, however, if at least about 95% conversion of isocyanate is achieved. If there is excess unreacted hydroxyacrylate remaining after this reaction, if will be polymerized under electron beam radiation.

Typical ratios of reactants used to make the oligomeric polyurethanes based on 0.80 mol of macroglycol and 0.2 mol of carboxyl-containing monomer include 2 mols of diisocyanate and 2 mols of hydroxyacrylate, 3 mols of diisocyanate and 4 mols of hydroxyacrylate, 4 mols of diisocyanate and 6 mols of hydroxyacrylate, 1.4 mols of diisocyanate and 0.8 mols of hydroxyacrylate.

In the preparation of supported magnetic compositions, the magnetic pigments used include gamma ferric oxide, cobalt modified iron oxide, chromium dioxide, metallic iron and barium ferrites and the like, as is well known to those skilled in the art. The magnetic pigment and binder are prepared in a dispersion with a solvent in which the polyurethane is at least partly soluble. Good solubility is preferred and polar solvents are used such as methyl ethyl ketone, acetone, tetrahydrofuran, cyclohexane, toluene, methyl isopropylketone, cyclohexanone, mixtures thereof, and the like are used.

Other binders may be included along with the electron beam curable polyurethanes of the invention if desired, such as thermal plastic polyurethanes, nitrocellulose, vinylchloride-acetate resins, cellulose acetate butyrate, Vinylite VAGH, Bakelite PKHH (Union Carbide).

Dispersing agents are generally used, including amine derived wetting agents, esters of oleic acid, quaternary ammonium salts, soya lecithin and the like. Lubricants are also often used such as silicone oils, high molecular weight fatty acids and their esters, organic stearates such as butoxy ethyl stearate, metal stearates, fluorinated hydrocarbons and the like. Aluminum oxide is sometimes used, as well as carbon black.

The pigment dispersions are usually prepared by milling, including sand milling, usually, or ball milling. Usually the binder is dissolved in the solvent. A dispersing agent is added, and the magnetic pigments along with the remainder of the other materials used. The prepared coating materials are then deposited on the desired substrate by reverse roll, knife, extruded die and the like, as is well known. The wet product is normally oriented along the long axis of the substrate, except floppy discs, exposed to a magnetic field and dried in zone ovens.

A variety of substrates may be used as nylon, polyesters, polyurethanes, cellulose, aluminum, and the like.

Thereafter the product is calendered, back-coated if wished, slit into tapes, or punched out if a floppy disc.

It is one of the prime objectives of this invention to provide a polyurethane binder that allows good dispersibility of the magnetic material at high pigment loadings. In this art, one useful method for determining pigment dispersibility is a gloss measurement. The better the pigment dispersion, the smoother the surface, and the higher the gloss value. In testing for gloss, a sample of the magnetic binder composition is coated on a substrate and tested with a standard glossmeter at 60° incident light. The gloss was measured parallel to the long axis of the film using a Gardener glossmeter, 60° incident light, with the calibration set to a black tile standard.

Magnetic properties are determined by means of a Vibrating Sample Magnetometer. The magnetic properties can change with the degree of dispersion of the magnetic particles. Squareness is defined as remanent magnetization is gauss divided by saturation magnetization in gauss ($B_r/B_s$) and preferably is about 0.75 or greater. Coercivity, Oe, is defined as the maximum value in oersteds required to reduce the magnetization of the material to zero and is determined by measuring magnetic sample strips of magnetic dispersion draw downs on Mylar support film on an instrument such as the Macroprocessor Controlled BH Meter, Model 7500A, LDJ Electronics, Inc.

EXAMPLE I

To demonstrate the practice of the invention and the advantage thereof, a polyurethane was prepared as follows. The molar ratio of, and reactants used was 2 mols of diphenyl methane-4,4'-diisocyanate, 0.8 mol of poly(tetramethylene adipate), molecular weight 3934; 0.2 mol of 2,2-dimethylol propionic acid, and 2.0 mols of hydroxyethyl methacrylate. 71.15 weight parts of the diphenylmethane-4,4'-diisocyanate and 134.96 weight parts of toluene were charged to a reaction vessel fitted with a stirrer, reflux condensor fitted with a $CaCl_2$ drying tube, $N_2$ entry port, thermocouple sensor and sample port. The reaction vessel was flushed with nitrogen for about 10 minutes while stirring these two materials. The mixture was heated to 80° C. The poly(tetramethylene adipate) and 2,2-dimethylol propionic acid were mixed together in a separate preparation and heated to 130° C. until a solution was obtained. This mixture was allowed to cool to 80° C. and 451.7 parts of the mixture was added to the diisocyanate/toluene solution at a rate to allow the exotherm to peak at no higher than the reflux temperature, 110° C. The temperature was allowed to cool to about 95° C. Samples were taken for testing until the isocyanate content reached 1.80±0.09%. 0.10 weight parts of the phenothiazine in 5 mls of toluene was then added to the reaction vessel. 37 parts of hydroxyethyl methacrylate was added to the reaction mixture at a rate to allow the exotherm to peak at no higher than the reflux temperature of the toluene. Thereafter, the temperature was held at 100° C. 0.14 weight parts of stannous octoate was added, samples were taken and the isocyanate content determined until the test showed about 0.09 weight percent free isocyanate groups, or less. The reaction mixture was then transferred to a dark storage container and blanketed with dry air. Infra-red spectra was then run to confirm the structure of the polyurethane.

The magnetic coating was prepared for testing by preparing a predispersion of magnetic pigment of γ-iron oxide, PF 2566 (Pfizer Co.) and oligomer solution and milling to form an ink, which was then coated onto a flexible Mylar substrate to form the sample magnetic recording tape for dispersion and recording magnetics measurements. The predispersion recipe used was, in parts by weight: curable oligomer, 40; toluene, 10; methyl ethyl ketone (MEK), 217; magnetic iron oxide, 160; methyl ethyl ketone (MEK), 73.

The above recipe was mixed by adding MEK to the curable oligomer/toluene solution to form a 15% total solids solution. A slurry of magnetic pigment was formed by slowly adding the pigment to the stirring oligomer solution. After the pigment was satisfactorily predispersed the resulting slurry was diluted further with MEK to form a 40% total solids (oligomer plus pigment) slurry. The slurry was finely dispersed in an Eiger Mill (micro attritor) using 187 grams of 1 millimeter diameter chromonite grinding media with 300 grams of slurry. After high speed milling (4000 rpm) for 2 hours with cooling water circulating, the resulting ink is coated onto a Mylar support film to a dry thickness of 2 to 3 mils to form a magnetic recording tape for testing pigment dispersibility and magnetic recording properties.

Samples were cured with electron beam at 3 and 5 megarads (MRAD). For 5 megarard dosages the films were exposed to a 5 milliamp, 185,000 volt beam at a rate of 22 feet per second linear speed of the film. Normally the range of exposure is from about 0.5 to less than 15 megarads, the latter being such that it often adversely affects the physical properties of the polymers. A more useful range is about 1 to 12 megarads.

Cure is evidenced by an increase in tensile strength as well as insolubility and decreased solubility, less swell, in tetrahydrofuran (THF). Samples that have not crosslinked or cured will dissolve in tetrahydrofuran, while cured samples will only swell. For this example, at zero exposure the tensile strength was 1035 psi, at 3 MRAD—2650, and at 5 MRAD 3515. The samples did not dissolve in THF, they only swelled.

Gloss values of 40.5 and 31.2 were obtained on a tape prepared from the polyurethane of this Example. The squareness ratio values were determined to be 0.741 and 0.786 in duplicate tests. Coercivity Oe was 714 and 703.

When the Example was repeated without the 2,2-dimethylol propionic acid, and with molar ratios of 2.0 mols of diphenylmethane-4,4'-diisocyanate, 1.0 mol of poly(tetramethylene adipate) and 2.0 mols of hydroxyethyl methacrylate and this polyurethane was formulated in the same tape composition, the 60° Gloss Index values were only 3.7 and 2.8. The Example was then repeated with 2.0 mols of diphenylmethane-4,4'-diisocyanate, 0.8 mols of poly(tetramethylene adipate), 0.2 mol of neopentyl glycol and 2.0 mols of hydroxyethyl methacrylate, the Gloss Index of a formulation of this material was found to be 1.8 and 1.6.

EXAMPLE II

Example I was repeated using a mixture of 0.9 mol of the poly(tetramethylene adipate) and 0.1 mol of 2,2-dimethylol propionic acid. Coated compositions thereof had a 60° C. Gloss value of 31.5, Coercivity Oe of 741, and a Squareness ratio of 0.818.

EXAMPLE III

The procedure of Example I was repeated using a poly(tetramethylene adipate) having a molecular weight of 3000. The 60° Gloss value was 86.6, Coercivity Oe was 735 and the Squareness ratio was 0.830.

EXAMPLE IV

The procedure of Example I was repeated with 1.6 mols of diphenylmethane-4,4'diisocyanate; 0.2 mol of poly(caprolactone glycol), molecular weight 514; 0.6 mol of poly(cyclohexane dimethanol carbonate), molecular weight 590; 0.2 mol of 2,2-dimethylol propionic acid and 1.3 mols of hydroxyethyl methacrylate. Magnetic compositions of this polyurethane had a 60° Gloss Value of 33.5.

Supported magnetic coatings prepared with the novel electron beam curable polyurethanes of this invention find application in audio tape, and especially computer tape and video tape that require high pigment loadings, as well as floppy discs.

I claim:

1. Electron beam-curable polyurethanes containing terminal acrylic groups and pendant carboxyl groups comprising the reaction product of (1) hydroxyl terminated polymers, (2) carboxyl containing compounds having at least two active hydrogen terminal groups reactive with isocyanate groups, (3) an organic diisocyanate and (4) a hydroxyacrylate.

2. Electron beam-curable polyurethanes of claim 1 wherein (1) are hydroxyl terminated polyesters, polyethers, polycaprolactones, polycarbonates and hydroxylterminated polymers of vinylidene monomers and epihalohydrin polymers, (2) has the formula

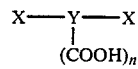

wherein X is amine or hydroxyl, Y is a backbone containing 3 to 12 carbon atoms free of pendant groups reactive with an isocyanate group other than carboxyl, and n is an integer from 1 to 4, (3) has the formula OCN—Ar—X—Ar—NCO wherein Ar is cyclic and X is a valence bond, an alkylene radical containing 1 to 6 carbon atoms, oxygen, sulfur, sulfoxide and sulfone, and (4) has the formula

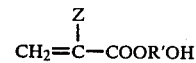

wherein Z is hydrogen or an alkyl radical containing 1 to 8 carbon atoms, and R' is a divalent alkylene radical containing 1 to 8 carbon atoms.

3. Electron beam-curable polyurethanes of claim 2 wherein (1) is a hydroxyl terminated polyester or polyether having average molecular weights of about 400 to 5,000, in (2) X is amine or hydroxyl, Y contains 3 to 12 carbon atoms and n is 1 or 2, in (3) X is a valence bond or methylene radical and in (4) Z is H or an alkyl radical containing 1 to 4 carbon atoms, and in R' there are 1 to 4 carbon atoms.

4. Electron beam-curable polyurethanes of claim 2 wherein (1) is selected from at least one of a polycaprolactone polyol and a polycarbonate glycol, in (2) X is amine or hydroxyl, Y contains 3 to 12 carbon atoms and n is 1 or 2, in (3) X is a valence bond or methylene radical and in (4) Z is H or an alkyl radical containing 1 to 4 carbon atoms, and in R' there are 1 to 4 carbon atoms.

5. Electron beam-curable polyurethanes of claim 4 wherein in (2) X is amine or hydroxyl, Y contains 3 to 12 carbon atoms and n is 1 or 2, in (3) X is a valence bond or methylene radical and in (4) Z is H or an alkyl radical containing 1 to 4 carbon atoms, and in R' there are 1 to 4 carbon atoms.

6. Electron beam-curable polyurethanes of claim 3 wherein (1) is polytetramethylene adipate, (2) is 2,2-hydroxymethyl propionic acid and (3) is isophorone diisocyanate or diphenylmethane-4,4'-diisocyanate and (4) is hydroxymethyl or hydroxyethyl methacrylate.

7. Electron beam-curable polyurethanes of claim 3 wherein (1) is poly(tetramethylene ether)glycol, (2) is 2,2-di-hydroxymethyl propionic acid and (3) is isophorone diisocyanate or diphenylmethane-4,4'-diisocyanate and (4) is hydroxymethyl or hydroxyethyl methacrylate.

8. Electron beam-curable polyurethanes of claim 4 wherein (1) is a mixture of polycaprolactone glycol and poly(cyclohexane dimethanol) carbonate, (2) is 2,2-di-hydroxymethyl propionic acid and (3) is isophorone diisocyanate or diphenylmethane-4,4'-diisocyanate and (4) is hydroxymethyl or hydroxyethyl methacrylate.

9. Supported magnetic coatings comprising a substrate and a coating comprising a magnetic pigment and electron beam-curable polyurethanes containing terminal acrylic groups and pendant carboxyl groups comprising the reaction product of (1) hydroxyl terminated polymers, (2) carboxyl containing compounds having at least two active hydrogen terminal groups reactive with isocyanate groups, (3) an organic diisocyanate and (4) a hydroxyacrylate.

10. Supported magnetic coatings of claim 9 wherein in the electron beam-curable polyurethanes (1) are hydroxyl terminated polyesters, polyethers, polycaprolactones, polycarbonates and hydroxyl-terminated polymers of vinylidene monomers and epihalohydrin polymers, (2) has the formula

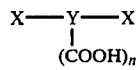

wherein X is amine or hydroxyl, X is a backbone containing 3 to 12 carbon atoms free of pendant groups reactive with an isocyanate group other than carboxyl, and n is an integer from 1 to 4, (3) has the formula OCN—Ar—X—Ar—NCO wherein Ar is cyclic and X is a valence bond, an alkylene radical containing 1 to 6 carbon atoms, oxygen, sulfur, sulfoxide and sulfone, and (4) has the formula

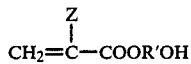

wherein Z is hydrogen or an alkyl radical containing 1 to 8 carbon atoms, and R' is a divalent alkylene radical containing 1 to 8 carbon atoms.

11. Supported magnetic coatings of claim 10 wherein in the electron beam-curable polyurethanes (1) is selected from at least one of a polycaprolactone polyol and a polycarbonate glycol in (2), n is 1 or 2, in (3) X is a valence bond or methylene radical and in (4) Z is H or an alkyl radical containing 1 to 4 carbon atoms, and in R' there are 1 to 4 carbon atoms.

12. Supported magnetic coatings of claim 10 wherein in the electron beam-curable polyurethanes (1) is a hydroxyl terminated polyester or polyether having average molecular weights of about 400 to 5,000, in (2) n is 1 or 2, in (3) X is a valence bond or methylene radical and in (4) Z is H or an alkyl radical containing 1 to 4 carbon atoms, and in R' there are 1 to 4 carbon atoms.

13. Supported magnetic coatings of claim 12 wherein in the electron beam-curable polyurethanes (1) is a hydroxyl terminated polyester of polyether having average molecular weights of about 400 to 5,000.

14. Supported magnetic coatings of claim 12 wherein (1) is polytetramethylene adipate, (2) is 2,2-hydroxymethyl propionic acid (3) is isophorone diisocyanate or diphenylmethane-4,4'-diisocyanate and (4) is hydroxymethyl or hydroxyethyl methacrylate.

15. Supported magnetic coatings of claim 12 wherein (1) is poly(tetramethylene ether)glycol, (2) is 2,2-dihydroxymethyl propionic acid, (3) is isophorone diisocyanate or diphenylmethane-4,4'-diisocyanate and (4) is hydroxymethyl or hydroxyethyl methacrylate.

16. Supported magnetic coatings of claim 12 wherein (1) is a mixture of polycaprolactone glycol and poly(cyclohexane dimethanol) carbonate, (2) is 2,2-dihydroxymethyl propionic acid, (3) is isophorone diisocyanate or diphenylmethane-4,4'-diisocyanate and (4) is hydroxymethyl or hydroxyethyl methacrylate.

* * * * *